(12) United States Patent
Lee

(10) Patent No.: US 8,194,728 B2
(45) Date of Patent: Jun. 5, 2012

(54) TAP/GROUP-REVIVABLE DECISION FEEDBACK EQUALIZING METHOD AND EQUALIZER USING THE SAME

(75) Inventor: Sheng-Lung Lee, Tainan County (TW)

(73) Assignee: Himax Media Solutions, Inc., Sinshih Township, Tainan County (TW)

(*) Notice: Subject to any disclaimer, the term of this patent is extended or adjusted under 35 U.S.C. 154(b) by 642 days.

(21) Appl. No.: 12/400,246

(22) Filed: Mar. 9, 2009

(65) Prior Publication Data

US 2010/0226424 A1 Sep. 9, 2010

(51) Int. Cl.
*H03H 7/30* (2006.01)

(52) U.S. Cl. ........ 375/233; 375/232; 375/231; 375/297; 375/345; 375/350

(58) Field of Classification Search .................. 375/233, 375/232, 231, 297, 345, 350
See application file for complete search history.

(56) References Cited

U.S. PATENT DOCUMENTS

| | | | |
|---|---|---|---|
| 5,923,226 A * | 7/1999 | Kakura et al. | 333/18 |
| 6,744,814 B1 * | 6/2004 | Blanksby et al. | 375/232 |
| 7,421,021 B2 * | 9/2008 | Balasubramonian et al. | 375/232 |
| 8,121,183 B2 * | 2/2012 | Zhong et al. | 375/230 |
| 2005/0111539 A1 * | 5/2005 | Tsuchiya | 375/229 |
| 2006/0088090 A1 * | 4/2006 | Azenkot et al. | 375/233 |
| 2007/0030930 A1 * | 2/2007 | Yousef | 375/346 |
| 2008/0063041 A1 * | 3/2008 | Galperin et al. | 375/233 |
| 2008/0205504 A1 * | 8/2008 | Tsuie et al. | 375/233 |
| 2009/0016422 A1 * | 1/2009 | Zhong et al. | 375/233 |

* cited by examiner

*Primary Examiner* — Kabir A Timory
(74) *Attorney, Agent, or Firm* — Thomas|Kayden

(57) ABSTRACT

A tap/group-revivable decision feedback equalizing method and equalizer using the same is disclosed. The equalizer includes a feed-forward filter and a feedback filter each with a plurality of taps divided in groups. The tap/group-revivable decision equalizing method includes training all the taps to generate their tap coefficients, and selecting all the taps of any of the groups with a tap coefficient greater than a predetermined value and selecting a number of taps of any of the groups without a tap coefficient greater than the predetermined value, but with a neighboring group with a tap coefficient greater than the predetermined value are selected, and having the selected taps utilized for equalization.

12 Claims, 3 Drawing Sheets

TAP/GROUP-REVIVABLE DECISION FEEDBACK EQUALIZING METHOD AND EQUALIZER USING THE SAME

BACKGROUND OF THE INVENTION

1. Field of the Invention

The invention relates to a decision feedback equalizer, and in particular, to a tap/group-revivable decision feedback equalizing method and equalizer using the same.

2. Description of the Related Art

In a communication system receiver, an equalizer is generally designed to eliminate multipath distortion to avoid signal distortion.

Referring to FIG. 1, a schematic diagram illustrating a decision feedback equalizer 10 of prior art is shown. The decision feedback equalizer 10 comprises a feed-forward filter 102, a feedback filter 104, a subtractor 106 and a slicer 108. The feed-forward filter 102 generates a pre-cursor signal t2 from a received input t1. The subtractor 106 subtracts a post-cursor signal t3 output by the feedback filter 104 from the pre-cursor signal t2 to generate an equalizer output t4. Then, the slicer 108 utilizes the equalizer output t4 to generate a decision output t5, which is fed to the feedback filter 104 so as to generate the post-cursor signal t3.

Referring to FIG. 2, a schematic diagram illustrating the feed-forward filter 102 and the feedback filter 104 of FIG. 1 is shown. The feed-forward filter 102 has M*m taps divided into M groups, wherein each group of the M groups has m taps. For example, there is a group 0 having a tap 0, a tap 1, ..., and a tap m−1. On the other hand, the feedback filter 104 has N*n taps divided into N groups, wherein each group of the N groups has n taps. For example, there is a group 0 having a tap 0, a tap 1, ..., and a tap n−1. Each tap of the feed-forward filter 102 or the feedback filter 104 has a corresponding tap coefficient.

In prior art, the taps of any of the groups of the feed-forward filter 102 or the feedback filter 104 may be selected and utilized for equalization depending upon whether a tap coefficient of the taps of any of the groups is greater than a predetermined value. If a tap coefficient of any of the groups is greater than the predetermined value, all the taps of any of the groups will be selected and utilized for equalization. Otherwise, all the taps of any of the groups will be dismissed and no longer be selected and utilized for equalization. However, since multi-path distortion may vary with time, the taps of any of the dismissed groups at a specified time due to dramatic multipath distortion may be useful at another specified time with normal multipath distortion. Thus, time-invariantly discarding the taps of any of the groups without a tap coefficient greater than the predetermined value can cause performance degradation of the equalizer 10.

BRIEF SUMMARY OF THE INVENTION

In one aspect, the present invention provides a tap/group-revivable decision feedback equalizing method for an equalizer. The equalizer comprises a feed-forward filter and a feedback filter each with a plurality of taps divided in groups. The tap/group-revivable decision feedback equalizing method comprises training all the taps to generate their tap coefficients, selecting the taps of any of the groups with a tap coefficient greater than a predetermined value, and selecting a number of taps of any of the groups without a tap coefficient greater than the predetermined value, but with a neighboring group with a tap coefficient greater than the predetermined value, and utilizing the selected taps for equalization.

In another aspect, the present invention provides a tap/group-revivable decision feedback equalizer, which comprises a feed-forward filter, a feedback filter, a subtractor, and a slicer. The feed-forward filter generates a pre-cursor signal from a received input. The subtractor subtracts a post-cursor signal output by the feedback filter from the pre-cursor signal to generate an equalizer output. Then, the slicer utilizes the equalizer output to generate a decision output, which is fed to the feedback filter so as to generate the post-cursor signal. In addition, the feed-forward filter has M*m taps divided into M groups, wherein each group of the M groups has m taps, and the feedback filter has N*n taps divided into N groups, wherein each group of the N groups has n taps. The present invention is featured in that the taps of any of the groups with a tap coefficient greater than a predetermined value, and a number of taps of any of the groups without a tap coefficient greater than the predetermined value, but with a neighboring group with a tap coefficient greater than the predetermined value are selected taps and utilized for equalization.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
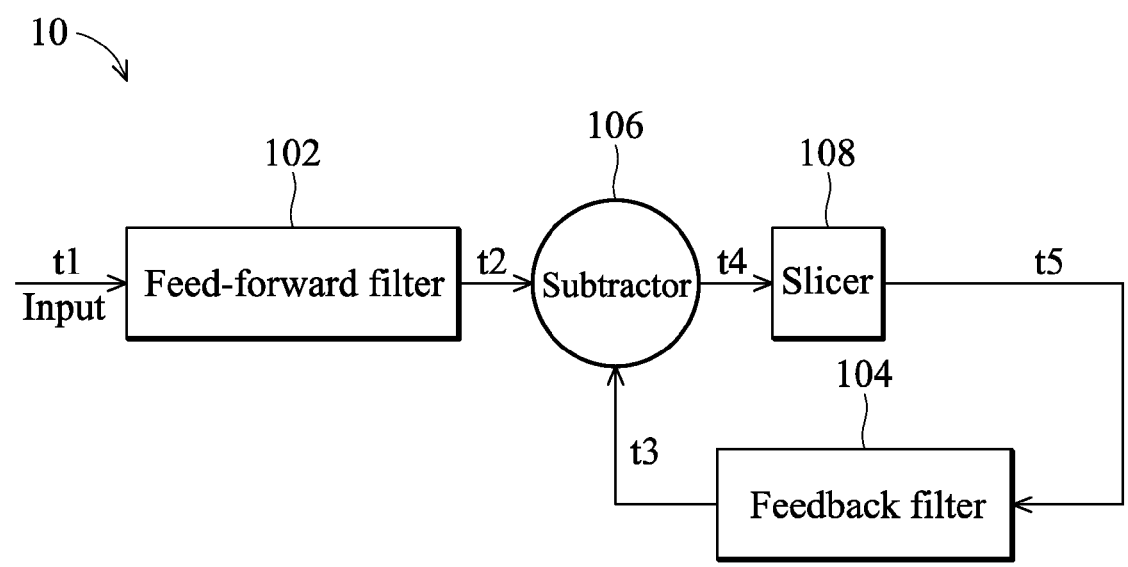
FIG. 1 is a schematic diagram illustrating an equalizer of prior art.
Figure 2:
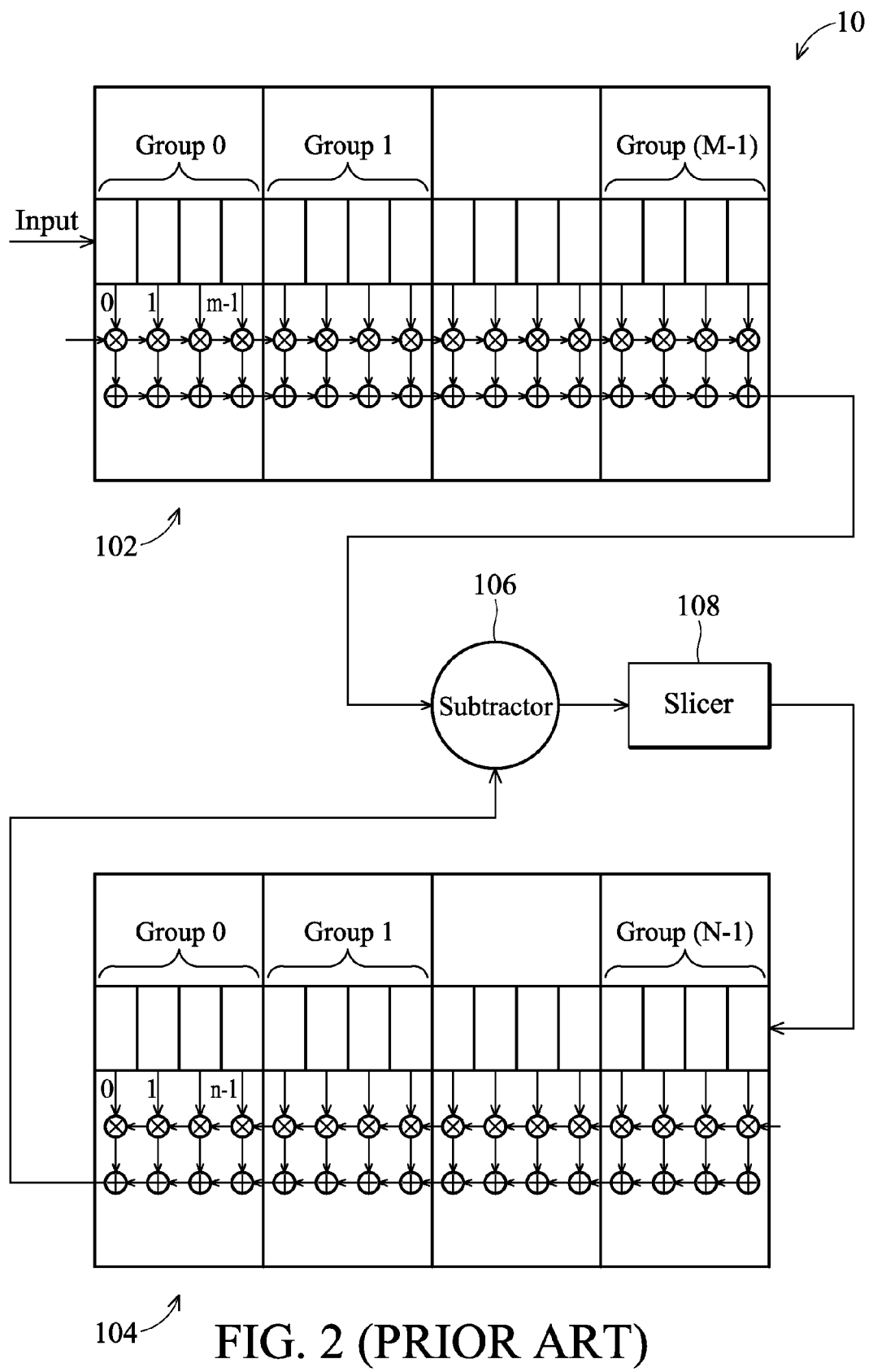
FIG. 2 is a schematic diagram illustrating the feed-forward filter and the feedback filter of FIG. 1.

Note that the architecture of the equalizer of FIG. 1 and FIG. 2 is referred to in describing embodiments of the invention, however, does not limit the scope of the present invention.

As mentioned previously, the tap/group-revivable decision feedback equalizer 10 comprises a feed-forward filter 102, a feedback filter 104, a subtractor 106 and a slicer 108. The feed-forward filter 102 has M*m taps divided into M groups, wherein each group of the M groups has m taps. The feedback filter 104 has N*n taps divided into N groups, wherein each group of the N groups has n taps. Each tap of the feed-forward filter 102 or the feedback filter 104 has a corresponding tap coefficient. Moreover, the tap/group-revivable decision feedback equalizer 10 is utilized for equalizing an ATSC (Advanced Television Systems Committee) data field, and is not limited thereto. The feed-forward filter 102 filters out a pre-cursor signal t2 from an input t1. The subtractor 106 subtracts a post-cursor signal t3 output by the feedback filter 104 from the pre-cursor signal t2 to generate an equalizer output t4. The slicer 108 slices the equalizer output t4 to generate a decision output t5, which is fed back to the feedback filter 104 and filtered to generate the post-cursor signal t3. In addition, the tap/group-revivable decision feedback equalizer 10 also comprises a selector unit (not shown), implemented as a circuit, a piece of program, or their combination, executing the flow chart in FIG. 3.

Figure 3:
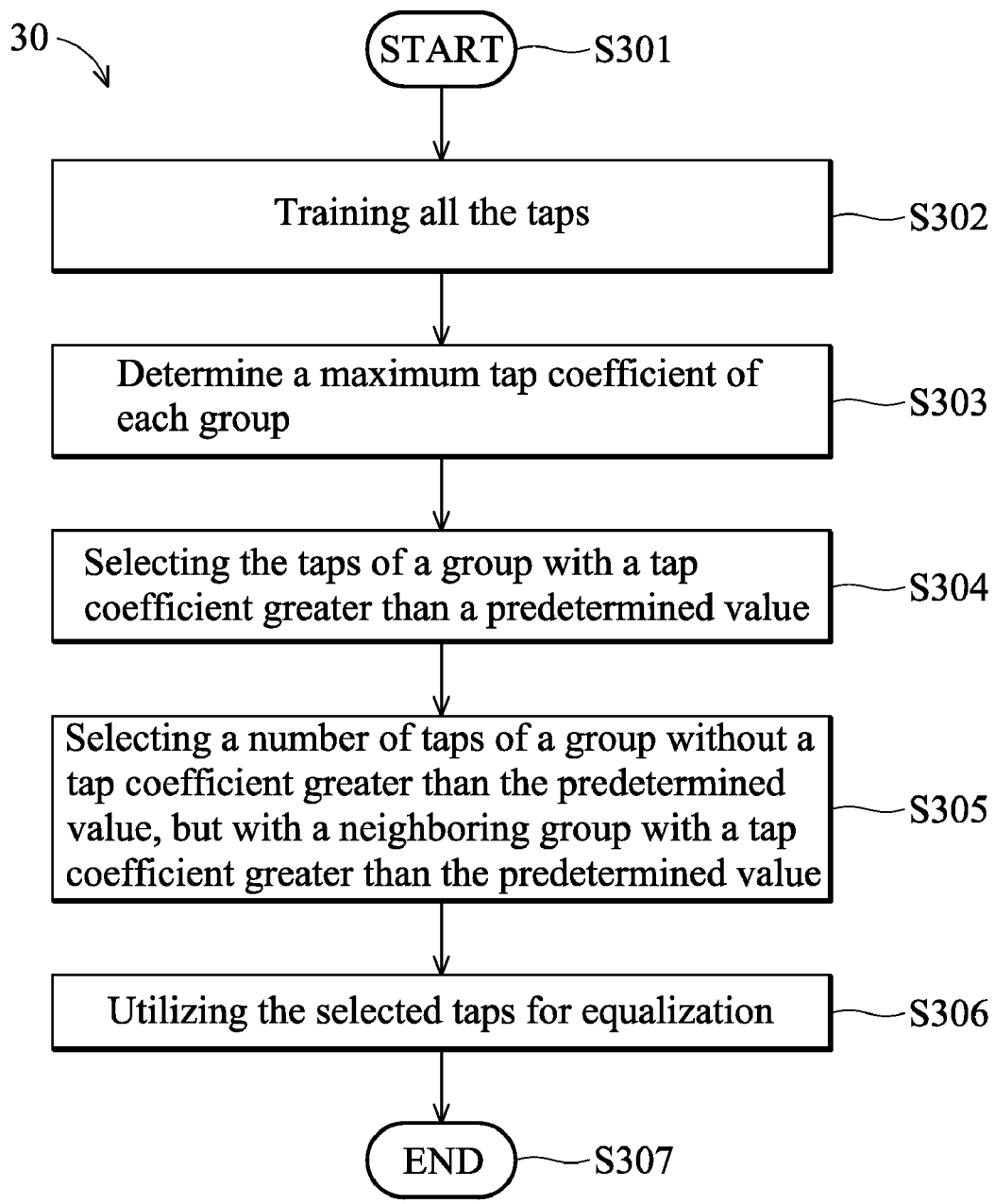
FIG. 3 is a flow chart illustrating a tap/group-revivable decision feedback equalizing method according to an embodiment of the present invention.

Referring to FIG. 3, a flow chart illustrating a tap/group-revivable decision feedback equalizing method 30 according to an embodiment of the present invention is shown. The tap/group-revivable decision feedback equalizing method 30 can be applied in equalizer 10 of FIG. 1 and FIG. 2 and starts at step S301.

In step S302, training all the taps of the feed-forward filter 102 and the feedback filter 104 is performed. Specifically, the tap/group-revivable decision feedback equalizer 10 performs calculations to generate all the required tap coefficients. However, since methods to generate all the required tap coefficients are well-known for those skilled in the art, detailed explanations will be omitted for brevity.

In step S303, a maximum tap coefficient of any of the groups of the feed-forward filter 102 or the feedback filter 104 is respectively determined.

In step S304, the taps of any of the groups of the feed-forward filter 102 and the feedback filter 104 with a tap coefficient greater than a first predetermined value and a second predetermined value are selected. Since all of the tap coefficients are calculated in step S302, the maximum tap coefficients of any of the groups of the feed-forward filter 102 and the feedback filter 104 may be compared with the first and second predetermined values. If the maximum tap coefficient of any of the groups of the feed-forward filter 102 or the feedback filter 104 is greater than the first or second predetermined value, all taps of any of the groups of the feed-forward filter 102 or the feedback filter 104 will be selected and utilized for subsequent equalization.

In step S305, a number of taps of any of the groups of the feed-forward filter 102 without a tap coefficient greater than the first predetermined value but with a neighboring group with a tap coefficient greater than the first predetermined value are selected, and a number of taps of any of the groups of the feedback filter 104 without a tap coefficient greater than the second predetermined value but with a neighboring group with a tap coefficient greater than the second predetermined value are selected. That is, any of the groups of the feed-forward filter 102 or the feedback filter 104 without a tap coefficient greater than the first or second predetermined value is not immediately dismissed as in prior art. On the contrary, the present invention will check the neighboring groups of any of the groups of the feed-forward filter 102 or the feedback filter 104 without a tap coefficient greater than the predetermined value. If one of the neighboring groups has a tap coefficient greater than the first or second predetermined value, a number of taps of any of the groups without a tap coefficient greater than the first or second predetermined value will be selected and utilized for subsequent equalization. For example, if group 1 (referring to FIG. 2) of the feed-forward filter 102 has no tap coefficient greater than the first predetermined value but group 0 has a tap coefficient greater than the first predetermined value, a number of taps of group 1 which are close to group 0 will be selected. Additionally, if group 2 also has a tap coefficient greater than the first predetermined value, a number of taps of group 1 which are close to group 2 will be selected as well. Thus, for any of the groups without a tap coefficient greater than the first or second predetermined value, if the left neighboring group or right neighboring group has a tap coefficient greater than the first or second predetermined value, a number of the taps that are close to the left neighboring group or right neighboring group would correspondingly be selected, and if both the left neighboring group and right neighboring group have a tap coefficient greater than the first or second predetermined value, a number of the taps that are close to the left neighboring group and a number of its taps that are close to the right neighboring group would correspondingly be selected. An amount of the number of taps selected is less than m and preferably less than m/2 for the feed-forward filter 102 and less than n and preferably less than n/2 for the feedback filter 104. The amount of the number of taps selected is not fixed and can be changed according to different design conditions.

In step S306, the tap/group-revivable decision feedback equalizer 10 utilizes the selected taps for equalization. Thus, completing the tap/group-revivable decision feedback equalizing method 30 at step S307.

Compared to prior art, the tap/group-revivable decision feedback equalizing method 30 of the present invention does not immediately dismiss any of the groups without a tap coefficient greater than the first or second predetermined value, and checks the neighboring groups to see if a number of taps of any of the groups without a tap coefficient greater than the predetermined value can be selected for subsequent equalization. Thus, any of the groups or taps thereof may be revived since the selecting steps will be performed repeatedly for every ATSC data field or for every predetermined number of ATSC data field. For example, if a first equalization is performed, wherein no tap coefficient greater than the predetermined value is determined for group 0, group 1 and group 2, but for group 3, a tap coefficient is greater than the predetermined value, then all the taps of group 0 and group 1 are not selected but a number of taps of group 2 that are close to group 3 and all the taps of group 3 are selected and utilized for equalization. Then, if a second equalization is performed, and one tap coefficient of the number of taps of group 2 that was previously selected is greater than the predetermined value, all the taps of group 2 will be selected and consequently a number of taps of group 1 that are close to group 2 will be revived to be selected and utilized for equalization because a tap coefficient of group 2 is greater than the predetermined value. Thus, a number of taps of group 1 and group 2 are revived at this time. If a subsequent equalization is performed, and one tap coefficient of the number of taps of group 1 that was previously selected is greater than the predetermined value, a number of taps of group 0 and all the taps of group 1 would be revived to be selected and utilized for equalization. Thus, all taps previously not selected may have chance to be revived, enhancing performance of the equalizer 10.

Note that the predetermined value designed for the feed-forward filter 102 and the feedback filter 104 can be different. In addition, the number of taps of any of the groups of the feed-forward filter 102 without a tap coefficient greater than the first predetermined value but with a neighboring group with a tap coefficient greater than the first predetermined value are those close to the neighboring group, and an amount of the number of taps of any of the groups of the feed-forward filter 102 without a tap coefficient greater than the first predetermined value but with a neighboring group with a tap coefficient greater than the first predetermined value is less than m and preferably less than m/2; the number of taps of any of the groups of the feedback filter 104 without a tap coefficient greater than the second predetermined value but with a neighboring group with a tap coefficient greater than the second predetermined value are those close to the neighboring group, and an amount of the number of taps of any of the groups of the feedback filter 104 without a tap coefficient greater than the second predetermined value but with a neighboring group with a tap coefficient greater than the second predetermined value is less than n and preferably less than n/2.

In addition, the present invention may also comprises a tap/group-revivable decision feedback equalizer, as shown in FIG. 1 and FIG. 2, which uses the tap/group-revivable decision feedback equalizing method 30, as shown in FIG. 3.

Referring to FIG. 1, the decision feedback equalizer 10 comprises a feed-forward filter 102, a feedback filter 104, a subtractor 106 and a slicer 108. The feed-forward filter 102 filters out a pre-cursor signal t2 from an input t1. The subtractor 106 subtracts a post-cursor signal t3 output by the feedback filter 104 from the pre-cursor signal t2 to generate an equalizer output t4. Then, the slicer 108 slices the equalizer output t4 to generate a decision output t5, which is fed to the feedback filter 104 and filtered to generate the post-cursor signal t3.

Referring to FIG. 2, the feed-forward filter 102 has M*m taps divided into M groups, wherein each group of the M groups has m taps. For example, there is a group 0 having a tap 0, a tap 1, . . . , and a tap m−1. The feedback filter 104 has N*n taps divided into N groups, wherein each group of the N groups has n taps. For example, there is a group 0 having a tap 0, a tap 1, . . . , and a tap n−1. Each tap of the feed-forward filter 102 or the feedback filter 104 has a corresponding tap coefficient.

Further, the tap/group-revivable decision feedback equalizer 10 includes a selector unit (not shown), which selects all taps of any of the groups of the feed-forward filter 102 with a tap coefficient greater than a first predetermined value, a number of taps of any of the groups of the feed-forward filter 102 without a tap coefficient greater than the first predetermined value but with a neighboring group with a tap coefficient greater than the first predetermined value, all taps of any of the groups of the feedback filter 104 with a tap coefficient greater than a second predetermined value, and a number of taps of any of the groups of the feedback filter 104 without a tap coefficient greater than the second predetermined value but with a neighboring group with a tap coefficient greater than the second predetermined value, and then utilizes the selected taps for equalization. In the specification, the term "unit" is used to denote a circuit, a piece of program, or their combination.

Note that the first predetermined value designed for the feed-forward filter 102 and the second predetermined value designed for the feedback filter 104 can be different. In addition, the selection of taps may be performed repeatedly for every ATSC data field or for every predetermined number of ATSC data field. In addition, the number of taps of any of the groups of the feed-forward filter 102 without a tap coefficient greater than the first predetermined value but with a neighboring group with a tap coefficient greater than the first predetermined value are those close to the neighboring group, and an amount of the number of taps of any of the groups of the feed-forward filter 102 without a tap coefficient greater than the first predetermined value but with a neighboring group with a tap coefficient greater than the first predetermined value is less than m and preferably less than m/2; the number of taps of any of the groups of the feedback filter 104 without a tap coefficient greater than the second predetermined value but with a neighboring group with a tap coefficient greater than the second predetermined value are those close to the neighboring group, and an amount of the number of taps of any of the groups of the feedback filter 104 without a tap coefficient greater than the second predetermined value but with a neighboring group with a tap coefficient greater than the second predetermined value is less than n and preferably less than n/2.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tap/group-revivable decision feedback equalizing method for a tap/group-revivable decision feedback equalizer, wherein the decision feedback equalizer comprises a feed-forward filter and a feedback filter, the feed-forward filter comprises a plurality of taps divided into M groups, and the feedback filter comprises a plurality of taps divided into N groups, wherein each group of the N groups has n taps, each group of the M groups has m taps, and M, N, m and n are integers greater than 2, comprising:
    training all the taps to generate their tap coefficients;
    selecting all the taps of any of the groups of the feed-forward filter with a tap coefficient greater than a first predetermined value and selecting all the taps of any of the groups of the feedback filter with a tap coefficient greater than a second predetermined value;
    selecting a number of taps of any of the groups of the feed-forward filter without a tap coefficient greater than the first predetermined value but with a neighboring group with a tap coefficient greater than the first predetermined value, and selecting a number of taps of any of the groups of the feedback filter without a tap coefficient greater than the second predetermined value but with a neighboring group with a tap coefficient greater than the second predetermined value; and
    utilizing the selected taps for equalization.

2. The tap/group-revivable decision feedback equalizing method as claimed in claim 1, wherein the step of selecting a number of taps of any of the groups of the feed-forward filter without a tap coefficient greater than the first predetermined value but with a neighboring group with a tap coefficient greater than the first predetermined value comprises selecting the taps in the group which are close to the neighboring group with a tap coefficient greater than the first predetermined value.

3. The tap/group-revivable decision feedback equalizing method as claimed in claim 2, wherein an amount of the number of taps of any of the groups of the feed-forward filter without a tap coefficient greater than the first predetermined value but with a neighboring group with a tap coefficient greater than the first predetermined value is less than m/2.

4. The tap/group-revivable decision feedback equalizing method as claimed in claim 1, wherein the step of selecting a number of taps of any of the groups of the feedback filter without a tap coefficient greater than the second predetermined value but with a neighboring group with a tap coefficient greater than the second predetermined value comprises selecting the taps in the group which are close to the neighboring group with a tap coefficient greater than the second predetermined value.

5. The tap/group-revivable decision feedback equalizing method as claimed in claim 4, wherein an amount of the number of taps of any of the groups of the feedback filter without a tap coefficient greater than the second predetermined value but with a neighboring group with a tap coefficient greater than the second predetermined value is less than n/2.

6. The tap/group-revivable method as claimed in claim 1, wherein the selecting steps are performed repeatedly for every ATSC (Advanced Television Systems Committee) data field or for every predetermined number of ATSC data fields.

7. A tap/group-revivable decision feedback equalizer comprising:
- a feed-forward filter filtering out a pre-cursor signal from an input, the feed-forward filter having a plurality of taps divided into M groups, wherein each group of the M groups has m taps, and M and m are integers greater than 2;
- a subtractor subtracting a post-cursor signal from the pre-cursor signal output by the feed-forward filter to generate an equalizer output;
- a slicer slicing the equalizer output into an decision output; and
- a feedback filter filtering the decision output into the post-cursor signal which is feedback to the subtractor, the feedback filter having a plurality of taps divided into N groups, wherein each group of the N groups has n taps, and N and n are integers greater than 2; and
- means for selecting all taps of any of the groups of the feed-forward filter with a tap coefficient greater than a first predetermined value, a number of taps of any of the groups of the feed-forward filter without a tap coefficient greater than the first predetermined value but with a neighboring group with a tap coefficient greater than the first predetermined value, all taps of any of the groups of the feedback filter with a tap coefficient greater than a second predetermined value, and a number of taps of any of the groups of the feedback filter without a tap coefficient greater than the second predetermined value but with a neighboring group with a tap coefficient greater than the second predetermined value and utilizing the selected taps for equalization.

8. The tap/group-revivable equalizer as claimed in claim 7, wherein the number of taps in any of the groups of the feed-forward filter without a tap coefficient greater than the first predetermined value but with a neighboring group with a tap coefficient greater than the first predetermined value are the taps close to the neighboring group with a tap coefficient greater than the first predetermined value are selected.

9. The tap/group-revivable equalizer as claimed in claim 8, wherein an amount of the number of taps of any of the groups of the feed-forward filter without a tap coefficient greater than the first predetermined value but with a neighboring group with a tap coefficient greater than the first predetermined value is less than m/2.

10. The tap/group-revivable equalizer as claimed in claim 7, wherein the taps of any of the groups of the feedback filter without a tap coefficient greater than the second predetermined value but with a neighboring group with a tap coefficient greater than the second predetermined value are the taps close to the neighboring group with a tap coefficient greater than the second predetermined value are selected.

11. The tap/group-revivable equalizer as claimed in claim 10, wherein an amount of the number of taps of any of the groups of the feedback filter without a tap coefficient greater than the second predetermined value but with a neighboring group with a tap coefficient greater than the second predetermined value is less than n/2.

12. The tap/group-revivable equalizer as claimed in claim 7, wherein the input is an ATSC field, and the taps are selected repeatedly for every ATSC data field or for every predetermined number of ATSC data fields.

* * * * *